(12) United States Patent
Lee et al.

(10) Patent No.: US 9,651,214 B2
(45) Date of Patent: May 16, 2017

(54) LIGHT EMITTING DIODE (LED) BULB AND LIGHTING SYSTEM HAVING HIGH AND LOW BEAMS

(71) Applicant: TSLC Corporation, Hsinchu (TW)

(72) Inventors: Cheng-Shih Lee, Hsinchu County (TW); Wei-Ping Lin, Hsinchu (TW); Sheng-Hsiung Lin, Yunlin County (TW)

(73) Assignee: TSLC Corporation, Hsinchu (TW)

( * ) Notice: Subject to any disclaimer, the term of this patent is extended or adjusted under 35 U.S.C. 154(b) by 231 days.

(21) Appl. No.: 14/676,966

(22) Filed: Apr. 2, 2015

(65) Prior Publication Data

US 2016/0290585 A1    Oct. 6, 2016

(51) Int. Cl.
*F21S 8/10* (2006.01)
*F21K 9/23* (2016.01)

(52) U.S. Cl.
CPC .............. *F21S 48/328* (2013.01); *F21K 9/23* (2016.08); *F21S 48/1159* (2013.01); *F21S 48/145* (2013.01); *F21S 48/147* (2013.01)

(58) Field of Classification Search
CPC .......................... F21S 48/1154; F21S 48/1159
See application file for complete search history.

(56) References Cited

U.S. PATENT DOCUMENTS

| 4,950,942 | A | 8/1990 | Braun et al. |
| 8,434,883 | B2 | 5/2013 | Doan et al. |
| 8,905,609 | B2 | 12/2014 | Tessnow et al. |
| 2002/0145883 | A1* | 10/2002 | Akizuki ............... F21S 48/1784 362/546 |
| 2011/0127912 | A1* | 6/2011 | Lee ....................... F21S 48/1159 315/32 |
| 2014/0328079 | A1* | 11/2014 | Itagaki ................... F21V 29/02 362/547 |
| 2016/0319999 | A1* | 11/2016 | Elzinga ................ F21S 48/1159 |

* cited by examiner

*Primary Examiner* — Evan Dzierzynski
(74) *Attorney, Agent, or Firm* — Stephen A. Gratton

(57) ABSTRACT

A light emitting diode (LED) bulb includes a base, a low beam emitter on the base configured to generate light rays to form a low beam, and a high beam emitter on the base configured to generate light rays to form a high beam. The low beam emitter includes two substrates separated by a core and configured as a heat sink, at least two low beam light emitting diode (LED) dice mounted to the substrates configured to emit the low beam light rays, and a shutter configured to block some of the low beam light rays and to shape the low beam. A lighting system includes the light emitting diode (LED) bulb and a reflector configured to generate the high beam and the low beam. In addition, the (LED) bulb can be retrofitted to conventional lighting systems, such as automotive lighting systems, having conventional reflectors.

20 Claims, 7 Drawing Sheets

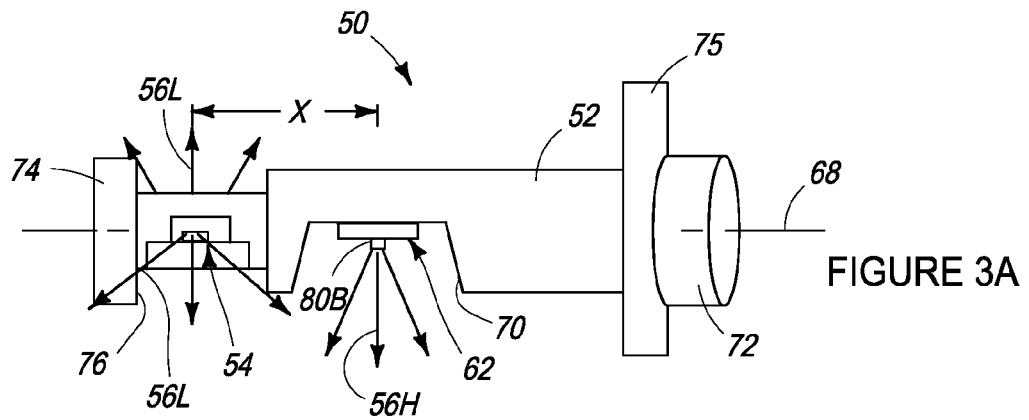
FIGURE 3A
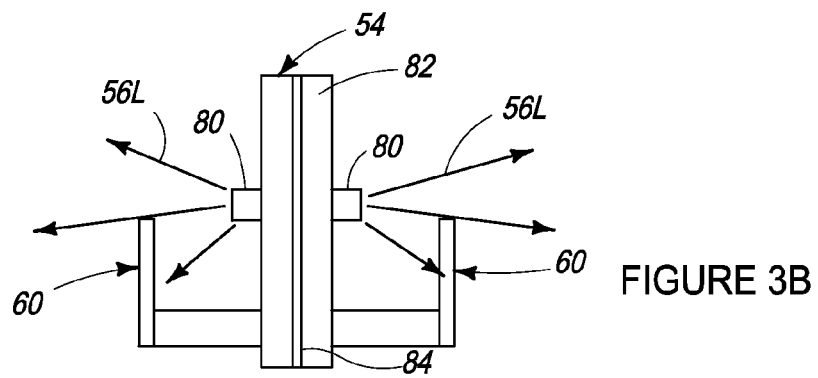
FIGURE 3B
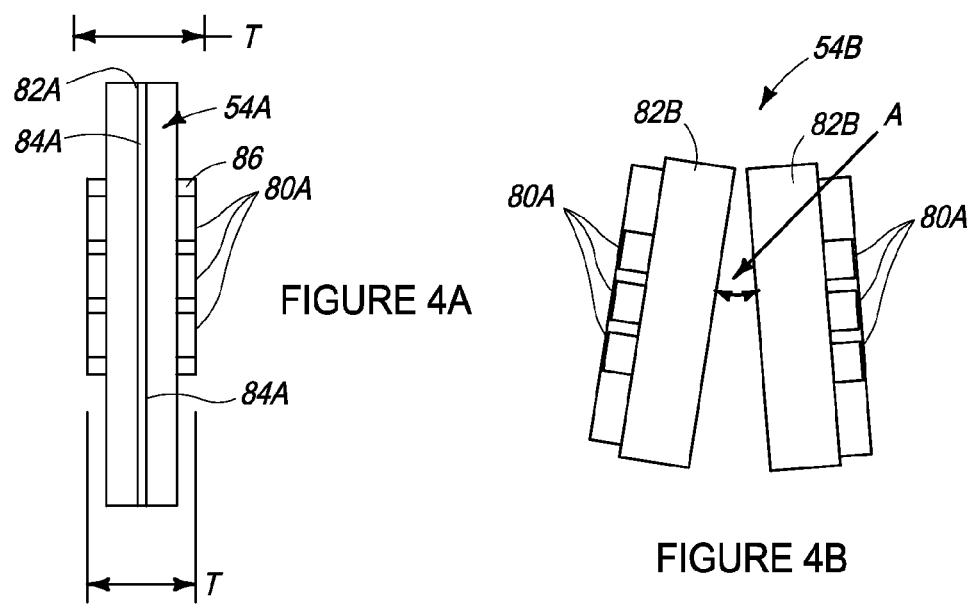
FIGURE 4A
FIGURE 4B

LIGHT EMITTING DIODE (LED) BULB AND LIGHTING SYSTEM HAVING HIGH AND LOW BEAMS

BACKGROUND

This disclosure relates generally to optoelectronic devices and more particularly to a light emitting diode (LED) bulb having high and low beams and to a lighting system constructed using the (LED) bulb.

Light emitting diode (LED) bulbs have been developed that are interchangeable with conventional light bulbs having incandescent and fluorescent light sources. Some light bulbs, such as H4 lamps used in automotive applications, can include a low beam light source and a high beam light source. These light bulbs can also include a reflector for collimating the light emitted by the light sources into light beam having desired patterns and angles of reflection. For example, in the high beam mode, light can be reflected in a beam of parallel rays located both above and below the x-axis (horizontal axis). In the low beam mode, light can be reflected in a beam of scattered rays extending in a direction below the x-axis.

Referring to FIG. 1, a prior art dual beam light bulb 10 includes a base 12 having contact pins 14, a driver 16 having a driver housing 18, and a transparent lens 20 having a mirrored tip 22. The light bulb 10 also includes a low beam filament 24, a high beam filament 26 and a shutter 28 on the low beam filament 24. The shutter 28 is configured to define the shape of the low beam light pattern and to prevent light from the low beam filament 24 from reflecting during the high beam mode.

As shown in FIGS. 2A-2C, the light bulb 10 can be mounted to a reflector 30 as a component of a lighting system 40, such as on a motor vehicle. As shown in FIG. 2A, in the high beam mode, light rays 32 are reflected from the reflector 30 to form a high beam 36 composed of parallel spaced rays reflected both above and below the horizontal axis 34. As shown in FIG. 2B, in the low beam mode, light rays 32 are reflected from the reflector 30 to form a low beam 38 of scattered rays reflected downward with respect to the horizontal axis 34. As shown in FIG. 2C, the high beam 36 is formed by the entire surface area of the reflector 30, while the low beam 38 is formed by only a portion of the surface area of the reflector 30 in an area defined by the shutter 28.

Dual beam (LED) light bulbs have also been designed using (LED) light sources. In some of these (LED) light bulbs, a single (LED) light source is configured to emit light in a first direction during the low beam mode, and in a second direction during the high beam mode. However, this type of (LED) light bulb does not function efficiently with prior art reflectors particularly in retrofit applications. For example, the low beam typically has no clear-cut boundaries, and the brightness of the low beam is less than with a halogen bulb.

In view of the foregoing, there is a need in the art for a dual beam (LED) bulb and lighting system having improved high and low beam patterns. There is also a need for a dual beam LED bulb that can be used with prior art reflectors and which can be retrofitted into conventional lighting systems including automotive systems. The present disclosure is directed to a light emitting diode (LED) bulb and lighting system having low and high beam patterns with improved brightness and definition, and which can be retrofitted to conventional reflectors.

SUMMARY

A light emitting diode (LED) bulb includes a base, a low beam emitter on the base configured to generate light rays to form a low beam, and a high beam emitter on the base configured to generate light rays to form a high beam. The low beam emitter can include spaced light emitting diode (LED) dice mounted to two substrates separated by a core configured as a heat sink, and a shutter configured to shape the low beam. The high beam emitter can include a light emitting diode (LED) die mounted to the base. The low beam emitter emits light rays from both sides of the axis of the base, while the high beam emitter emits light rays from only one side of the axis. In addition, the low beam emitter, the high beam emitter and the substrates are constructed to form both the low beam and the high beam with well-defined patterns. A lighting system includes the light emitting diode (LED) bulb and a reflector configured to reflect the light rays to form the high beam and the low beam. In addition, the (LED) bulb can be retrofitted to conventional lighting systems, such as automotive lighting systems, having conventional reflectors.

BRIEF DESCRIPTION OF THE DRAWINGS

Exemplary embodiments are illustrated in the referenced figures of the drawings. It is intended that the embodiments and the figures disclosed herein are to be considered illustrative rather than limiting.

FIG. 3A is a schematic cross sectional view of a dual beam light emitting diode (LED) bulb having (LED) light sources;

FIG. 3B is an enlarged schematic cross sectional view illustrating a low beam emitter of the dual beam light emitting diode (LED) bulb;

FIG. 4A is a schematic cross sectional view of an alternate embodiment low beam emitter of the dual beam light emitting diode (LED) bulb having multiple (LED) light sources on either side of a longitudinal axis;

FIG. 4B is a schematic cross sectional view of an alternate embodiment low beam emitter of the dual beam light emitting diode (LED) bulb having multiple (LED) light sources angled relative to the longitudinal axis by a small angle A;

DETAILED DESCRIPTION

Figure 5A:
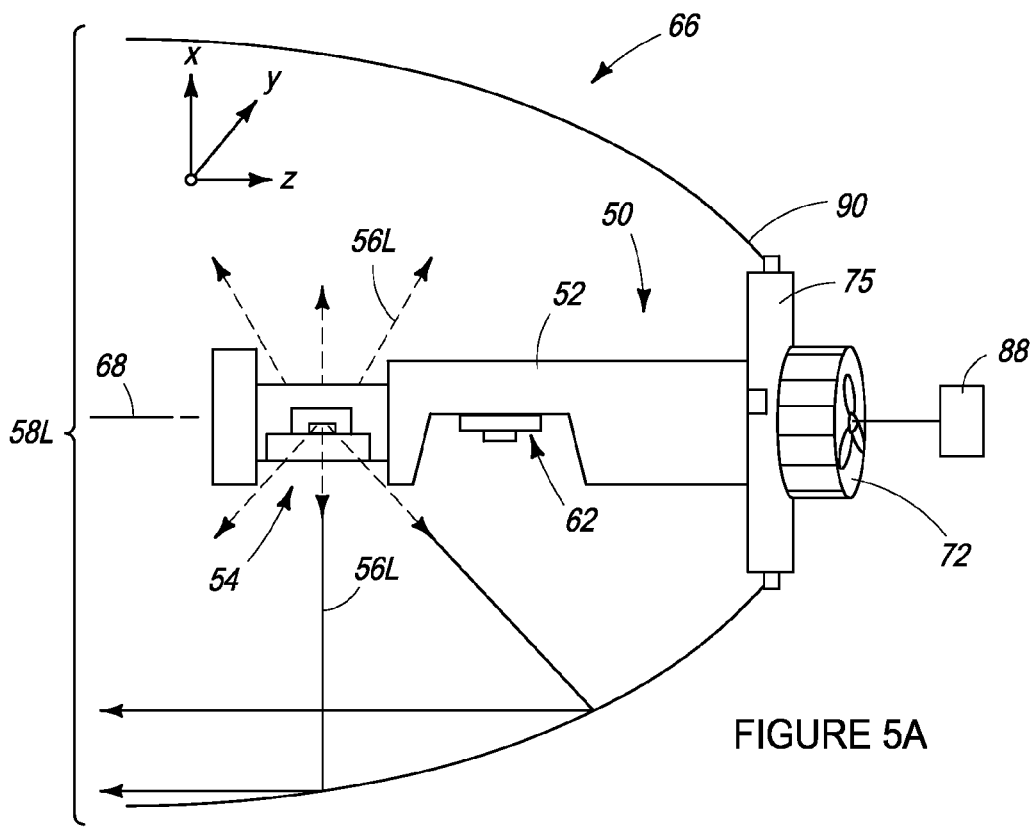
FIG. 5A is a schematic view of a lighting system with the dual beam light emitting diode (LED) bulb in a low beam mode.
Figure 5B:
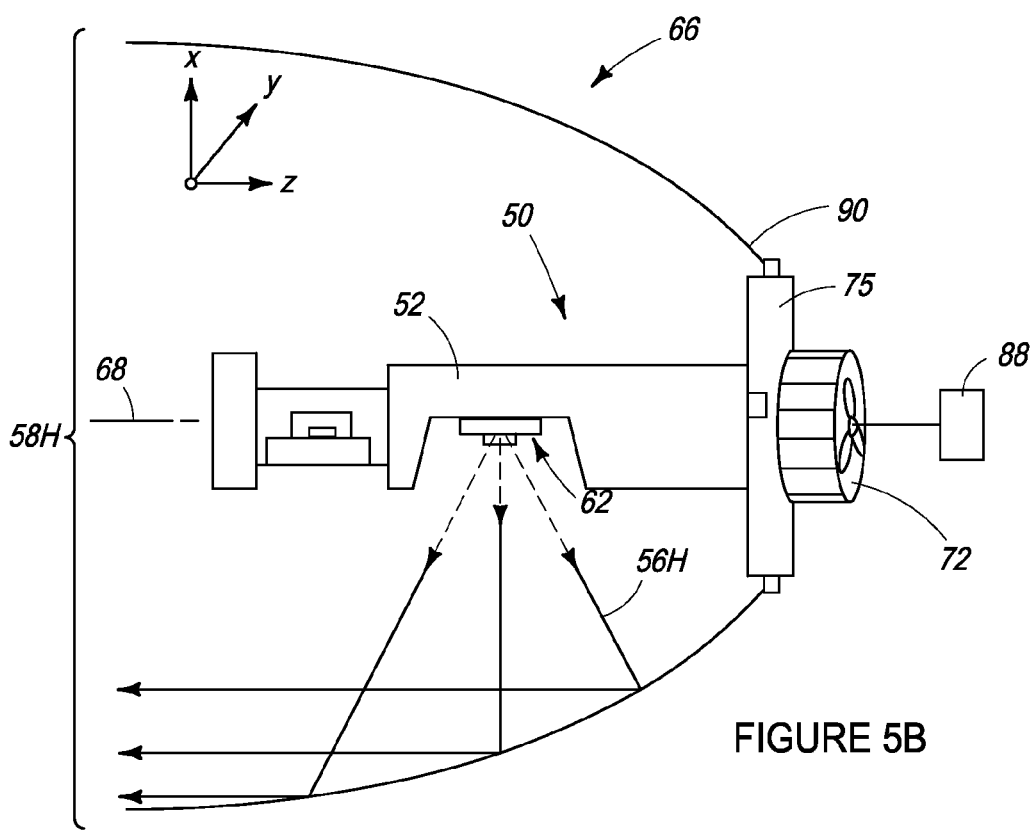
FIG. 5B is a schematic view of the lighting system with the dual beam light emitting diode (LED) bulb in a high beam mode.

Referring to FIGS. 3A-3B, a dual beam light emitting diode (LED) bulb 50 includes a base 52, a low beam emitter 54 on the base 52 configured to generate light rays 56L to form a low beam 58L (FIG. 5A) and having a shutter 60 configured to shape the low beam 58L (FIG. 5A), and a high beam emitter 62 on the base 52 configured to generate light rays 56H to form a high beam 58H (FIG. 5B). The light emitting diode (LED) bulb 50 can be used to construct a lighting system 66 (FIG. 5A), and can be used to replace a dual beam halogen lamp in a conventional lighting system. For simplicity some elements of the light emitting diode (LED) bulb 50 such as driver circuitry are not illustrated.

Figure 1:
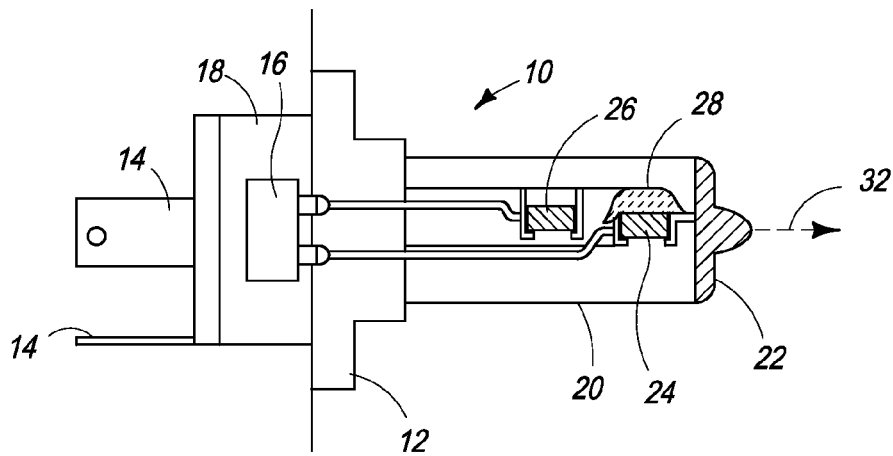
FIG. 1 is a schematic cross sectional view of a prior art dual beam light bulb having low beam and high beam light sources.
Figure 2A:
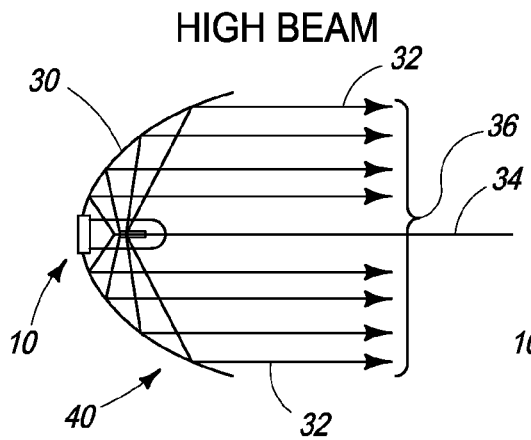
FIG. 2A is a schematic cross sectional view of a prior art lighting system with the dual beam light bulb in a high beam mode.
Figure 2B:
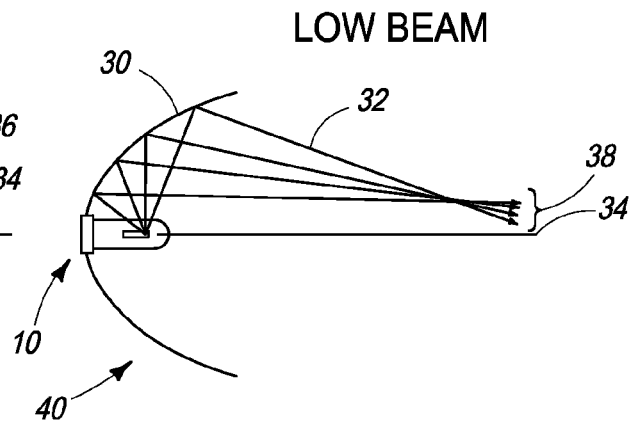
FIG. 2B is a schematic cross sectional view of the prior art lighting system of FIG. 2A in a low beam mode.
Figure 2C:
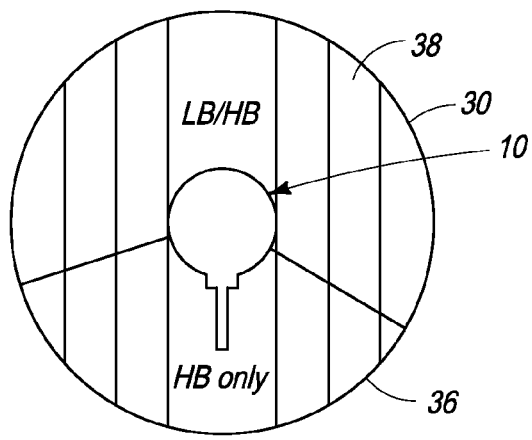
FIG. 2C is a schematic cross sectional view of a reflector of the prior art lighting system of FIG. 2A illustrating areas of low beam and high beam reflection.

As shown in FIG. 3A, the base 52 has an elongated generally cylindrical shape and includes a longitudinal axis 68, a heat sink 72, and a terminal portion 74. The longitudinal axis 68 also forms the optical axis of the light emitting diode (LED) bulb 50 along which the low beam 58L (FIG. 5A) and the high beam 58H (FIG. 5B) are transmitted. The base 52 can comprise a metal or plastic material, and can be similar in size and shape to the prior art light emitting diode (LED) bulb 10 (FIG. 1), such that the light emitting diode (LED) bulb 50 can be used in retrofit and after-market applications. In addition, the heat sink 72 of the base 52 can include a mounting flange 75, and contact pins (not shown) similar to the previously described contact pins 14 (FIG. 1) configured to provide electrical paths for powering and controlling the dual beam light emitting diode (LED) bulb 50. For example, the heat sink 72 can include three contact pins including a low beam contact pin, a high beam contact pin and a common contact pin.

The base 52 also includes a first recess 70 wherein the high beam emitter 62 is located, and a terminal portion 74 with a second recess 76 wherein the low beam emitters 54 are located. The first recess 70 and the second recess 76 can be spaced and located in locations corresponding to the low beam filament 24 and the high beam filament 26 in the prior art light emitting diode (LED) bulb 10. In addition, the terminal portion 74 can be coated with a high radiation coefficient material, such as Al, configured to efficiently dissipate heat by radiation.

Referring to FIG. 3B, the low beam emitter 54 includes a plurality of light emitting diode (LED) dice 80 mounted on two substrates 82. In the illustrative embodiment the two substrates 82 include opposing mounting surfaces for the light emitting diode (LED) dice 80. In addition, a core 84 (or film) is located between the substrates 82 and is configured as a heat sink for dissipating heat generated by the light emitting diode (LED) dice 80. The core 84 can comprise graphite or a similar material having heat dissipating characteristics. The shutter 60 is also configured to dissipate heat generated by the light emitting diode (LED) dice 80, and like the terminal portion 74 of the base 52 can be coated with a high radiation coefficient material, such as paint. The substrates 82 can comprise a high thermally conductive material, such as a ceramic, an Al metal core PCB (MCPCB), or a Cu metal core PCB (MCPCB). In addition, the core 84 (or film) can be inserted between the substrates 82 and can have an area that is larger than that of the light emitting diode (LED) dice 80 to provide efficient heat dissipation. In addition, the substrates 82 can have a thickness selected to space the emitter surfaces of the opposing light emitting diode (LED) dice 80 from one another by a precise distance T, which is equal to the combined thicknesses of the substrates 82, the core 84, and the light emitting diode (LED) dice 80. A representative value for the thickness T is preferably less than 4 mm.

The substrates 82 and the light emitting diode (LED) dice 80 are positioned on the base 52 of the beam light emitting diode (LED) bulb 50 such that the light rays 56L are emitted from the low beam emitter 54 substantially along the x-axis and from both sides of the longitudinal axis 68 of the base 52 (i.e., from opposing sides of the longitudinal axis 68). As shown in FIG. 3B, the shutter 60 is configured for activation in the low beam mode to block some of the light rays 56L emitted by the low beam emitter 54 and to shape the low beam 58L (FIG. 5A). As shown in FIG. 4A, an alternate embodiment low beam emitter 54A includes two substrates 82A having a graphite core 84A between the substrates 82A and multiple light emitting diode (LED) dice 80A on the substrates 82A encapsulated in an encapsulant 86, such as silicone. As shown in FIG. 4B, an alternate embodiment low beam emitter 54B includes two angled substrates 82B positioned to angle the light emitting diode (LED) dice 80A by a small angle A. The angled configuration modifies the light pattern and decreases the light blocked by the shutter 60.

As shown in FIG. 3A, the high beam emitter 62 can comprise a light emitting diode (LED) die 80B (or alternately multiple (LED) dice) configured to emit the light rays 56H. The high beam emitter 62 can be spaced from the low beam emitter 54 by a distance X, which can be approximately equal to the distance between the low beam filament 24 and the high beam filament 26 in the prior art light emitting diode (LED) bulb 10. In addition, an emitting surface of the light emitting diode (LED) die 80B can be located along the longitudinal axis 68 of the base 52, such that the light rays 56H are emitted generally downward in the y-direction with respect to the longitudinal axis 68.

Referring to FIGS. 5A-5B, the lighting system 66 includes the light emitting diode (LED) bulb 50 mounted to a reflector 78. The lighting system 66 also includes a reflector 90 and an electrical receptacle (not shown) for electrically connecting the contacts (not shown) on the heat sink 72 of the base 52 of the light emitting diode (LED) bulb 50 to an electrical system 88. As shown in FIG. 5A, during the low beam mode, the low beam emitter 54, which is comprised of the two substrates 82 (FIG. 3B) and the light emitting diode (LED) dice 80 (FIG. 3B) separated by the graphite core 84 (FIG. 3B), is enabled to emit light rays 56L in a direction along the y-axis and the −y-axis. During the low beam mode, the shutter 60 is enabled to block some of the light rays 56L, and to shape the low beam 58L. Also during the low beam mode, the high beam emitter 62 is controlled to not emit light rays. The low beam 58L is thus formed entirely by the low beam emitter 54 and is transmitted along an optical axis coincident to the longitudinal axis 68 of the base 52. In addition, the low beam 58L is shaped by the shutter 60 and by the location of the low beam emitter 54 on the base 52. Also in the low beam mode, the low beam light rays 56L are emitted from both sides of the longitudinal axis 68, which utilizes all of the reflector 90, and helps to define the boundaries for the low beam 58L.

As shown in FIG. 5B, the high beam emitter 62 is configured such that the light rays 56H are transmitted generally in the x-direction, which can be perpendicular to the longitudinal axis 68 of the base 52. Also during the high beam mode, the low beam emitter 54 is controlled to not emit light rays. Also with the lighting system 66 installed in a motor vehicle, the longitudinal axis 68 will be generally parallel to the ground, such that the light rays 56H are transmitted generally downward with respect to the longitudinal axis 68 of the base 52. In addition, the high beam 58H is transmitted along an optical axis coincident to the longitudinal axis 68 of the base 52.

Figure 6A:
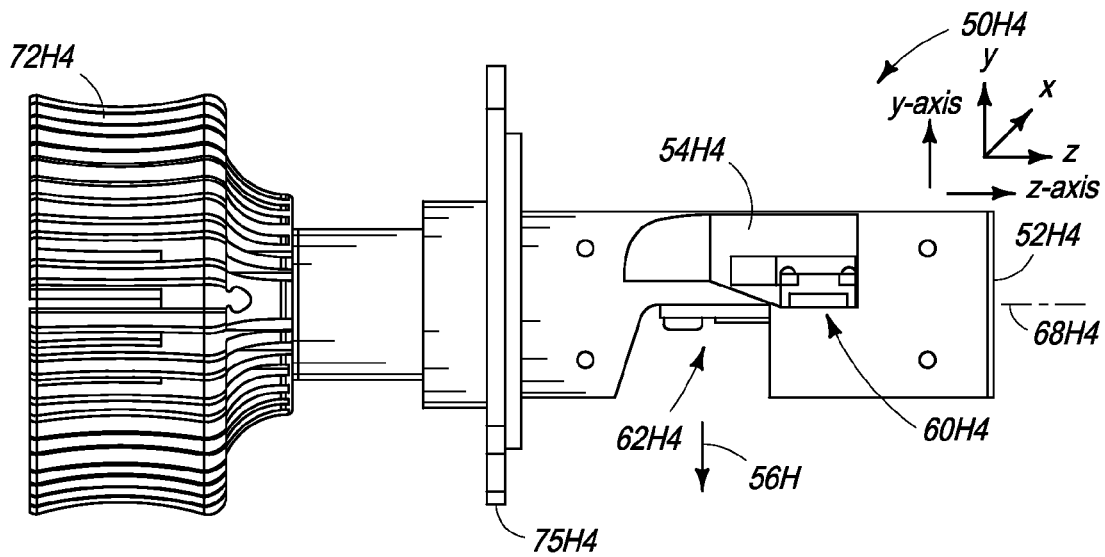
FIG. 6A is a schematic side view of an H4 light emitting diode (LED) bulb.
Figure 6B:
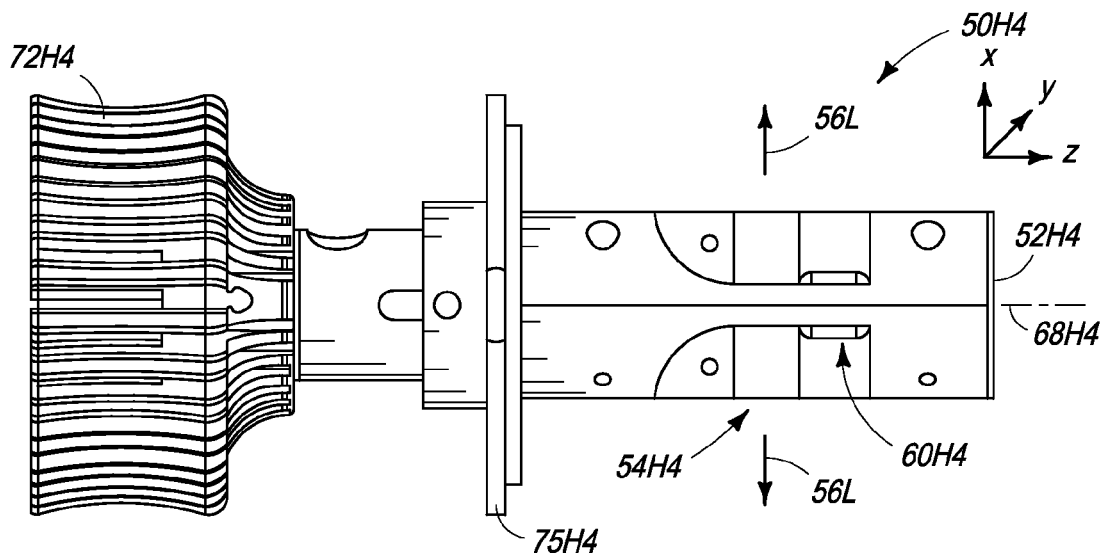
FIG. 6B is a schematic top view of the H4 light emitting diode (LED) bulb.
Figure 6C:
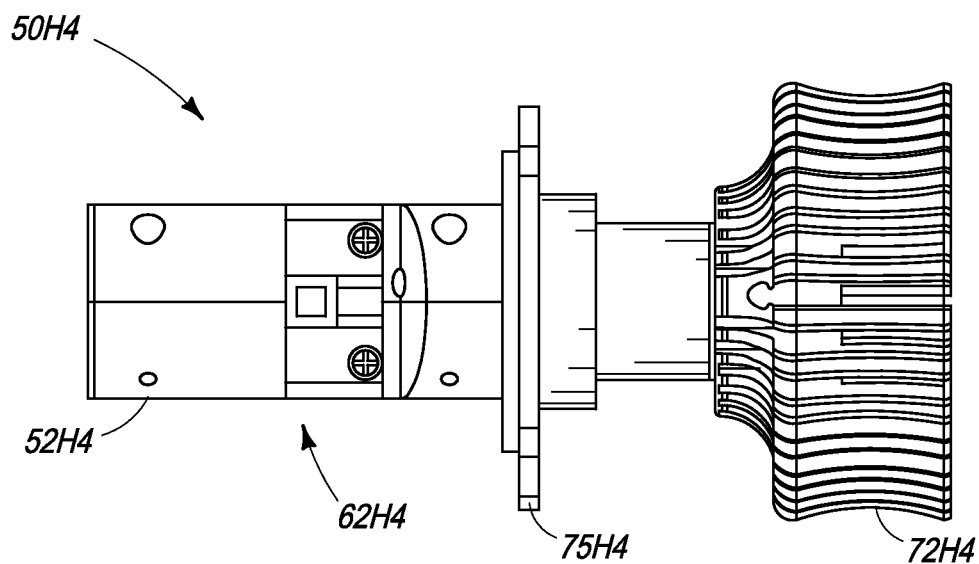
FIG. 6C is a schematic bottom view of the H4 light emitting diode (LED) bulb.
Figure 6D:
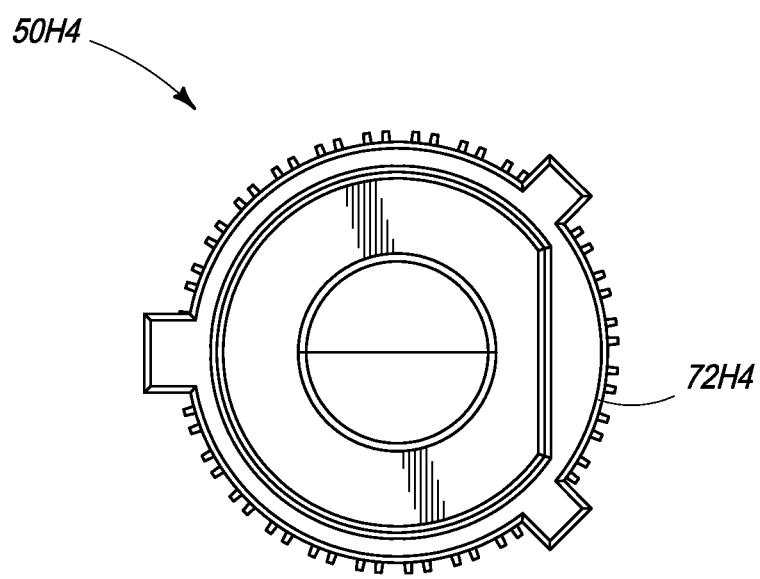
FIG. 6D is a schematic front view of the H4 light emitting diode (LED) bulb.

Different types of dual beam light bulbs, such as H4 and 9007 can be constructed by appropriate configurations of the light emitting diode (LED) bulb 50. For example, as shown in FIGS. 6A-6D, an H4 light emitting diode (LED) bulb 50H4 includes a generally cylindrical base 52H4 having a longitudinal axis 68H4. The H4 light emitting diode (LED) bulb 50H4 mounts to the vehicle such that a front direction extends forward along the z-axis parallel to the longitudinal axis 68H4, and a top direction extends along the y-axis upward and perpendicular to the longitudinal axis 68H4. The H4 light emitting diode (LED) bulb 50H4 includes a heat sink 72H4 having a fan-like configuration similar to a conventional H4 bulb, and a mounting flange 75H4 for mounting to the vehicle. The H4 light emitting diode (LED) bulb 50H4 also includes a high beam emitter 62H4 configured to emit high beam light ray 56H, and two low beam emitters 54H4 with a shutter 60H4 configured to emit low beam light rays 56L. As shown in FIG. 6A, the high beam emitter 62H4 emits light rays 56H generally downward away from the top direction and along the y-axis on only one side of the longitudinal axis 68H4 of the base 52H4. As shown in FIG. 6B, the low beam emitter 54H4 emits light rays 56L generally along the x-axis and on both sides of the longitudinal axis 68H4 of the base 52H4. The H4 light emitting diode (LED) bulb 50H4 functions substantially as previously described for the light emitting diode (LED) bulb 50.

Figure 7A:
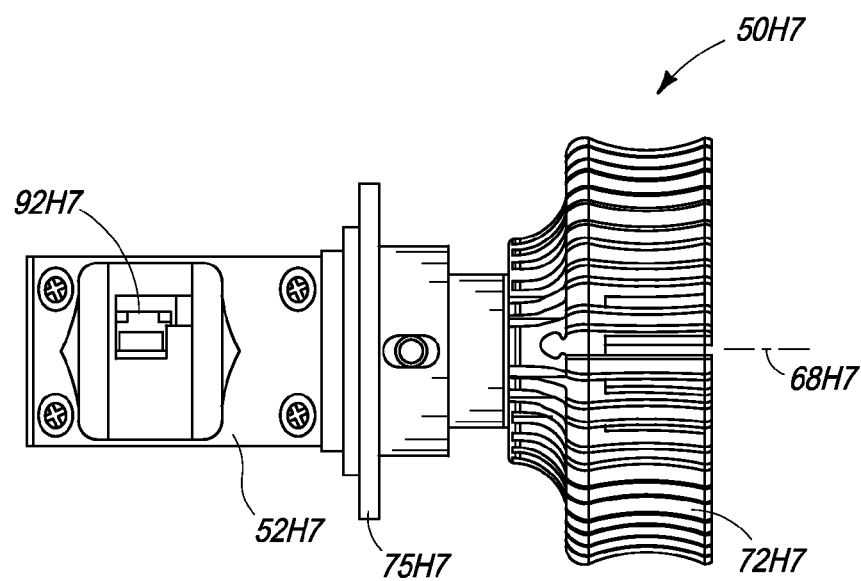
FIG. 7A is a schematic side view of an H7 light emitting diode (LED) bulb.
Figure 7B:
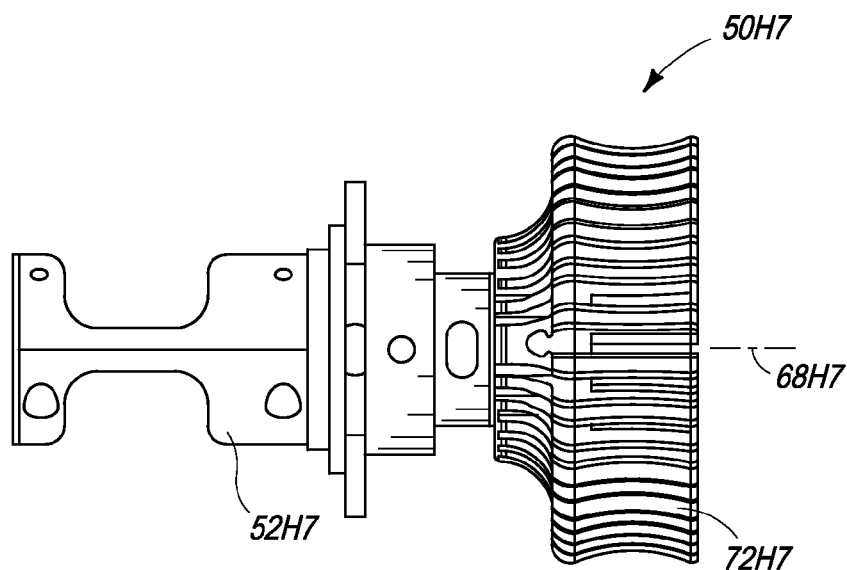
FIG. 7B is a schematic top view of the H7 light emitting diode (LED) bulb.
Figure 7C:
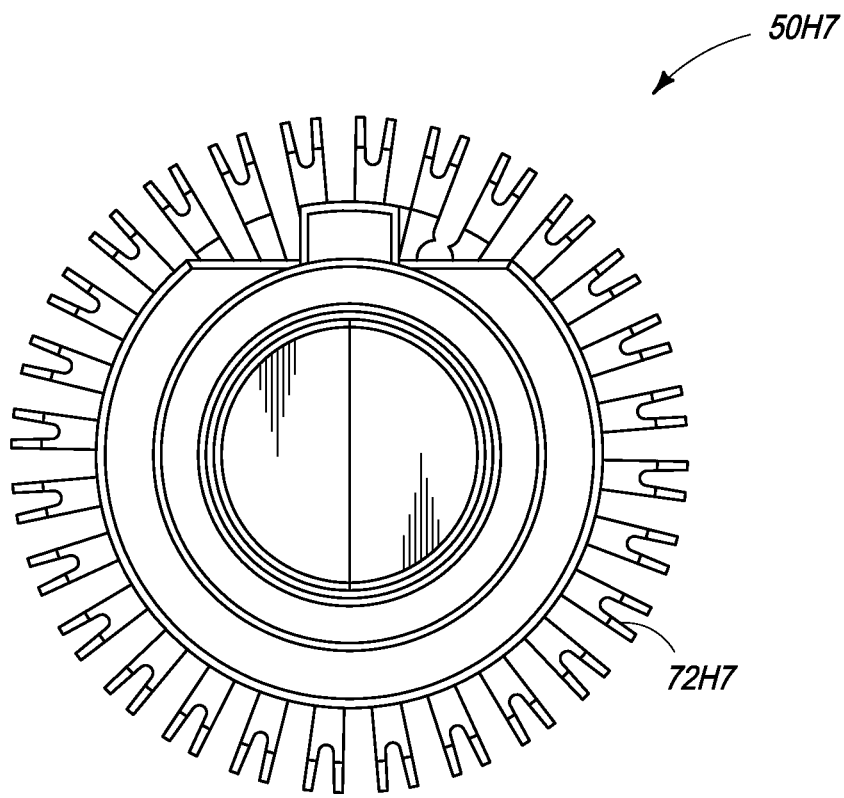
FIG. 7C is a schematic front view of the H7 light emitting diode (LED) bulb.
Figure 8:
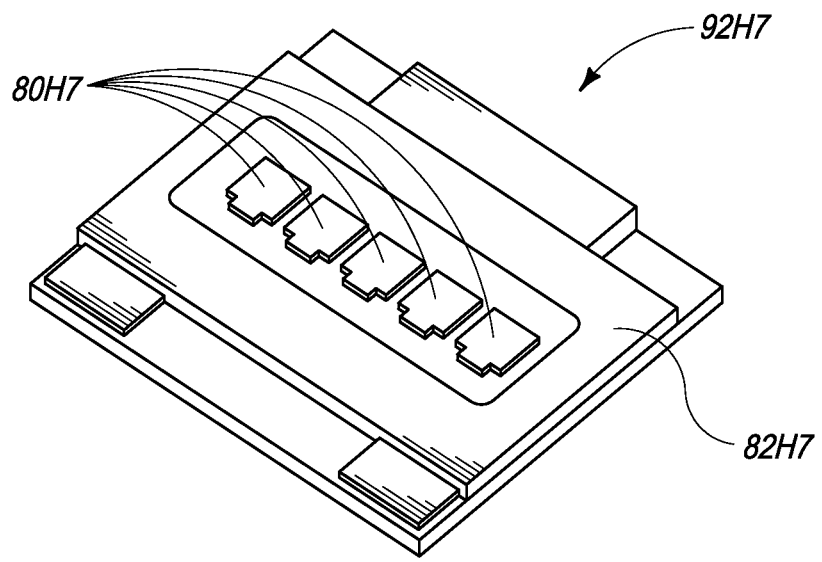
FIG. 8 is a perspective view of an emitter structure of the H7 light emitting diode (LED) bulb.

Referring to FIGS. 7A-7C, an H7 light emitting diode (LED) bulb 50H7 is illustrated. A conventional H7 lamp has only one filament rather than a low beam filament and a high beam filament as in an H4 lamp, such that the H7 light emitting diode (LED) bulb 50H7 reflects this configuration. The H7 light emitting diode (LED) bulb 50H7 includes a generally cylindrical base 52H7 having a longitudinal axis 68H7. The H7 light emitting diode (LED) bulb 50H7 also includes a heat sink 72H7 having a fan-like configuration similar to a conventional H7 bulb, and a mounting flange 75H7 for mounting to the vehicle. The H7 light emitting diode (LED) bulb 50H7 also includes two emitters 92H7 located on both sides of a longitudinal axis 68H7 of a base 82H7. As shown in FIG. 8, the emitter 92H7 includes the base 82H7 and one or more LED dice 80H7 (e.g., 1 to 20) mounted to the base 82H7. Each LED die 80H7 can include a phosphor layer encapsulated by an outer silicone layer. The H7 light emitting diode (LED) bulb 50H7 can be used to replace a light bulb in a vehicle electrical system having a receptacle and reflector substantially as previously described and shown in FIGS. 5A and 5B. In the case of the reflector being designed for only a low beam, the H7 light emitting diode (LED) bulb 50H7 can be configured to produce the low beam. In the case of the reflector being designed for only a high beam, the H7 light emitting diode (LED) bulb 50H7 can be configured to produce the high beam.

Thus the disclosure describes an improved light emitting diode (LED) bulb and lighting system. While a number of exemplary aspects and embodiments have been discussed above, those of skill in the art will recognize certain modifications, permutations, additions and subcombinations thereof. It is therefore intended that the following appended claims and claims hereafter introduced are interpreted to include all such modifications, permutations, additions and sub-combinations as are within their true spirit and scope.

What is claimed is:

1. A light emitting diode (LED) bulb comprising:
   a base having an axis;
   a low beam emitter on the base configured to emit a plurality of low beam light rays on both sides of the axis to form a low beam, the low beam emitter comprising two substrates separated by a core and configured as a heat sink, a plurality of low beam light emitting diode (LED) dice mounted to the substrates configured to emit the low beam light rays, and a shutter configured to block some of the low beam light rays and to shape the low beam; and
   a high beam emitter on the base spaced from the low beam emitter and configured to emit a plurality of high beam light rays to form a high beam, the high beam emitter comprising a high beam light emitting diode (LED) die mounted to the base configured to emit the high beam light rays in a direction away from the longitudinal axis.

2. The light emitting diode (LED) bulb of claim 1 wherein the substrates of the low beam emitter include opposing mounting surfaces for the low beam light emitting diode (LED) dice configured to space emitting surfaces of the low beam light emitting diode (LED) dice by a distance T.

3. The light emitting diode (LED) bulb of claim 1 wherein each substrate comprise ceramic or a metal core PCB (MCPCB).

4. The light emitting diode (LED) bulb of claim 1 wherein the base includes a first recess for the high beam emitter and a second recess for the low beam emitter separated by a distance X.

5. The light emitting diode (LED) bulb of claim 1 wherein the substrates of the low beam emitter are configured to mount the low beam light emitting diode (LED) dice at an angle A with respect to one another.

6. The light emitting diode (LED) bulb of claim 1 further comprising a reflector attached to the base configured to reflect the low beam light rays to form the low beam and the high beam light rays to form the high beam.

7. The light emitting diode (LED) bulb of claim 1 wherein the low beam light emitting diode (LED) dice for the low beam emitter are encapsulated in an encapsulant on the substrate.

8. A dual beam light emitting diode (LED) bulb configured to replace a light bulb in a vehicle electrical system having a receptacle and a reflector comprising:
   a base having a recess, a longitudinal axis, and a heat sink configured for electrical contact with the receptacle of the electrical system;
   a low beam emitter on the base configured to emit a plurality of low beam light rays on both sides of the longitudinal axis of the base onto the reflector to form a low beam, the low beam emitter comprising two substrates separated by a core and configured as a heat sink, a plurality of low beam light emitting diode (LED) dice mounted on the substrates configured to emit the low beam light rays, and a shutter configured to block some of the low beam light rays and to shape the low beam, the substrates having opposing mounting surfaces for the low beam light emitting diode (LED)

dice configured to space emitting surfaces of the light emitting diode (LED) dice by a distance T; and a high beam emitter on the base spaced from the low beam emitter by a distance X and configured to emit a plurality of high beam light rays onto the reflector to form a high beam comprised of the high beam light rays, the high beam emitter comprising a high beam light emitting diode (LED) die mounted in the recess on the base configured to emit the high beam light rays along one side of the longitudinal axis.

9. The dual beam light emitting diode (LED) bulb of claim 8 wherein the base includes a second recess for the low beam emitter separated from the recess by a distance X.

10. The dual beam light emitting diode (LED) bulb of claim 8 wherein the core comprises graphite.

11. The dual beam light emitting diode (LED) bulb of claim 8 wherein each substrate comprise ceramic or a metal core PCB (MCPCB).

12. The dual beam light emitting diode (LED) bulb of claim 8 wherein the light emitting diode (LED) dice for the low beam emitter are encapsulated in an encapsulant on the substrate.

13. The dual beam light emitting diode (LED) bulb of claim 8 wherein the light bulb comprises an H4 lamp.

14. The dual beam light emitting diode (LED) bulb of claim 8 wherein the high beam light emitting diode (LED) die for the high beam emitter is mounted along the longitudinal axis such that the high beam light rays emanate along one side of the longitudinal axis.

15. A lighting system comprising:
a reflector having an electrical receptacle;
a base having a recess, a longitudinal axis, and a heat sink attached to the electrical receptacle;
a low beam emitter on the base configured to emit a plurality of low beam light rays on both sides of the longitudinal axis to form a low beam, the low beam emitter comprising two substrates separated by a core and configured as a heat sink, a plurality of low beam light emitting diode (LED) dice mounted to the substrates configured to emit the low beam light rays, and a shutter configured to block some of the low beam light rays and to shape the low beam; and
a high beam emitter on the base spaced from the low beam emitter and configured to emit a plurality of high beam light rays to form a high beam comprised of the high beam light rays, the high beam emitter comprising a high beam light emitting diode (LED) die mounted to the base configured to emit the high beam light rays along the longitudinal axis.

16. The lighting system of claim 15 wherein the base includes a first recess for the high beam emitter and a second recess for the low beam emitter separated by a distance X.

17. The lighting system of claim 15 wherein the core comprises graphite.

18. The lighting system of claim 15 wherein lighting system comprises a motor vehicle lighting system.

19. The lighting system of claim 15 wherein the low beam light emitting diode (LED) dice for the low beam emitter are encapsulated in an encapsulant on the substrate.

20. The lighting system of claim 15 wherein the high beam light rays are emitted from only one side of the longitudinal axis.

* * * * *